(No Model.)

A. J. SMART.
COMBINED DRILL AND COUNTERSINK.

No. 299,429. Patented May 27, 1884.

Attest:
F. W. Howard
Edw. H. Downs

Inventor:
Albert J. Smart
By C. S. Whitman
Atty.

UNITED STATES PATENT OFFICE.

ALBERT J. SMART, OF GREENFIELD, MASSACHUSETTS, ASSIGNOR TO THE WILEY & RUSSELL MANUFACTURING COMPANY, OF MASSACHUSETTS.

COMBINED DRILL AND COUNTERSINK.

SPECIFICATION forming part of Letters Patent No. 299,429, dated May 27, 1884.

Application filed July 10, 1883. (No model.)

*To all whom it may concern:*

Be it known that I, ALBERT J. SMART, a citizen of the United States, residing at Greenfield, in the county of Franklin and State of Massachusetts, have invented certain new and useful Improvements in Combined Drill and Countersink; and I do hereby declare the following to be a full, clear, and exact description of the invention, such as will enable others skilled in the art to which it appertains to make and use the same.

My invention relates to that class of drills which are made use of for boring holes in metal or hard substances; and the nature thereof consists in combining with the drill a conical cutter for chamfering the edge of the hole cut by the drill, and thus forming a countersink or enlargement to receive the head of a screw or bolt.

Figure 1:
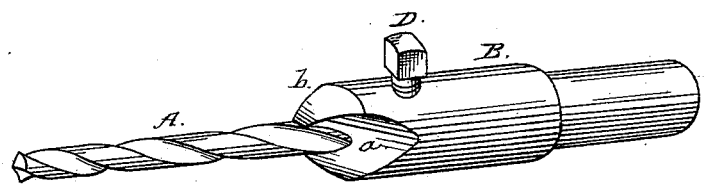
Figure 2:
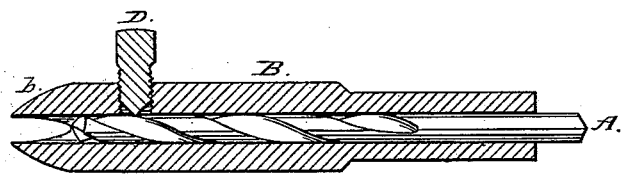

In the accompanying drawings, Figure 1 represents the countersink-dill with the parts thereof combined and ready for use. Fig. 2 illustrates the drill detached from the countersink.

A designates a twist-drill of the usual form, and B is a hollow cylinder having one of its ends chamfered or beveled to a proper angle. This chamfered or beveled edge is formed by turning a conical surface, *b*, and filing upon it depressions *a* in such a manner as to form teeth or cutters for chamfering or enlarging the hole cut by the drill.

The boring-implement illustrated in the drawings is a twist-drill; but other drills may be used, if preferred.

The cylinder upon which the chamfer cutters or countersink is formed is provided with a hole or bore extending entirely through it from end to end, in order that a drill of any length can be passed through, and that the drill may be pushed back or drawn within the cylinder to allow of the cutting-edges of the countersink being ground. This hollow cylinder serves as a support to the drill-spindle.

A tool of the construction described is particularly applicable to the operation of securing the tire to a carriage-wheel, although of course it may be used for many purposes. When used for this purpose, it is placed in a proper holder or machine and rotated in such a manner that the drill passes through the tire and felly, while the cutting-edges of the hollow cylinder chamfer and enlarge the hole cut by the drill, and form a countersink or enlargement of the hole to receive the head of the tire or countersunk-headed bolt. The drill is secured to the cylinder, and relatively adjusted thereto by means of the set-screw D, which, on being turned down, holds the drill in any desired position, and so that its end may be at any desired distance from the countersink.

In a device such as that herein described for working both wood and iron together—for instance, tires and fellies varying much in thickness—it is of the greatest importance that means should be supplied for lengthening and shortening the inner or drilling bit, so as to admit of its projecting a greater or less distance from the countersinking-tool. This is effected by locating the set-screw D, which holds the drill in position, as near as possible to the end of the outer tool or countersink, and having the latter chambered throughout its whole length, as described.

Having thus described my invention, I claim and desire to secure by Letters Patent—

The countersink metal drill consisting of a hollow supporting-cylinder, upon the end of which is formed a countersink, a drill-spindle capable of passing through the chamber of the cylinder, and a set-screw located near the countersink end of the cylinder, all combined as and for the purposes described.

In testimony whereof I affix my signature in presence of two witnesses.

ALBERT J. SMART.

Witnesses:
JOHN PUTNAM,
WILLIAM S. WILLIAMS.